No. 866,298. PATENTED SEPT. 17, 1907.
W. C. PARIS.
ADDING MACHINE.
APPLICATION FILED MAR. 27, 1907.
9 SHEETS—SHEET 2.
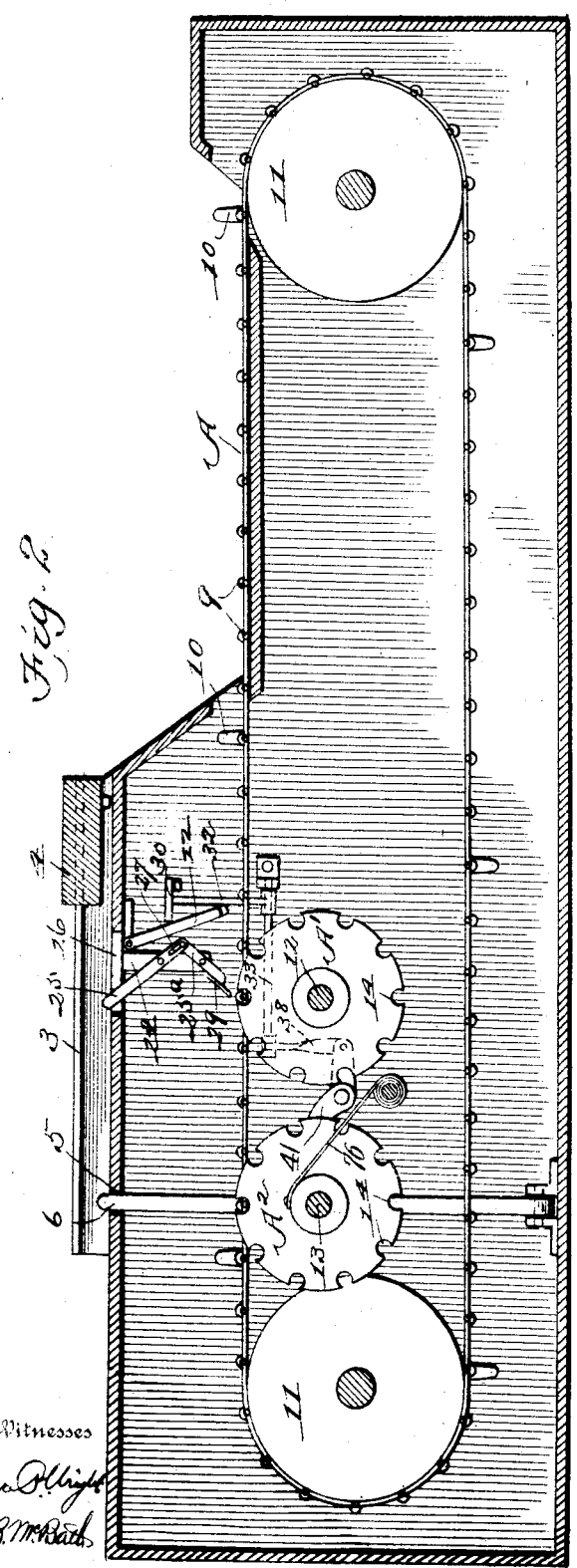
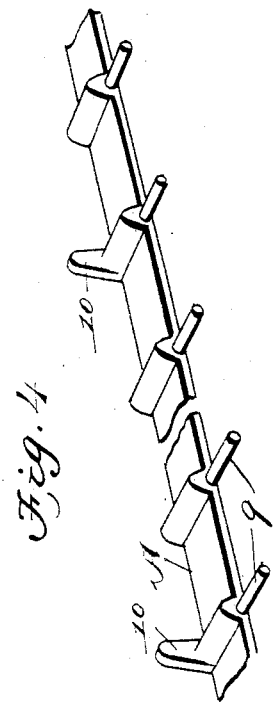
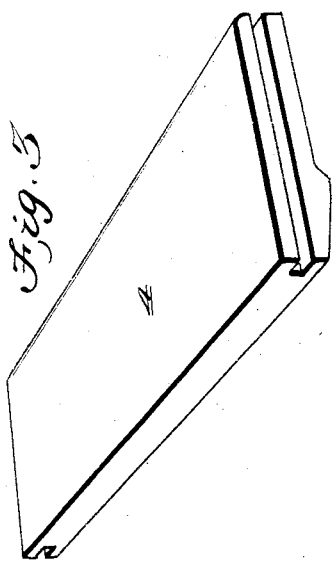

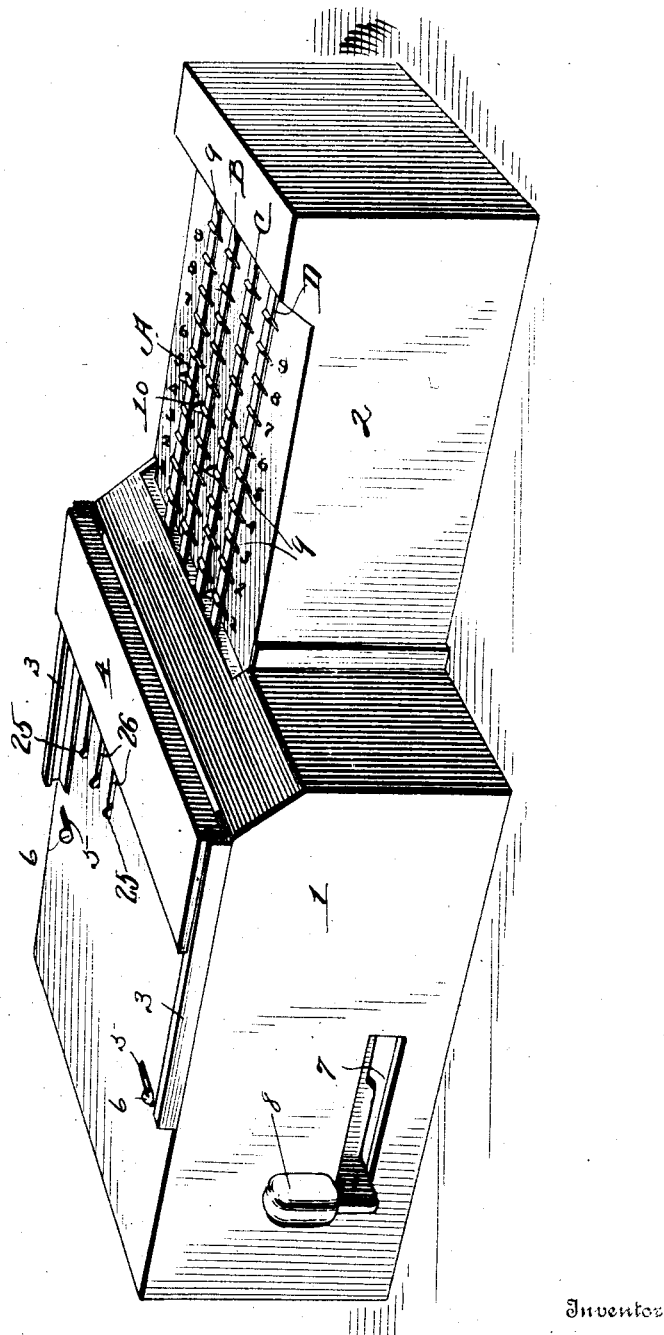

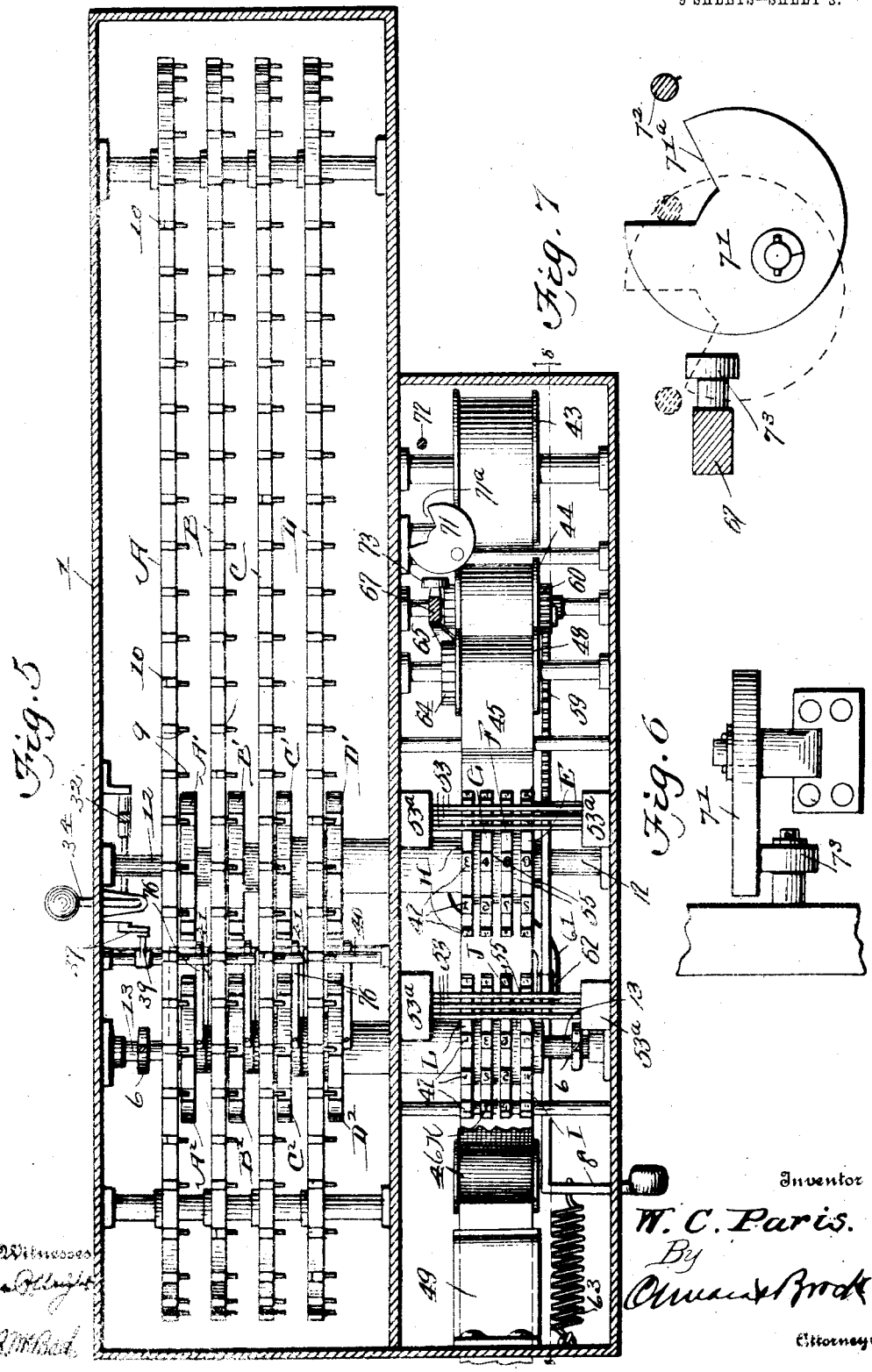

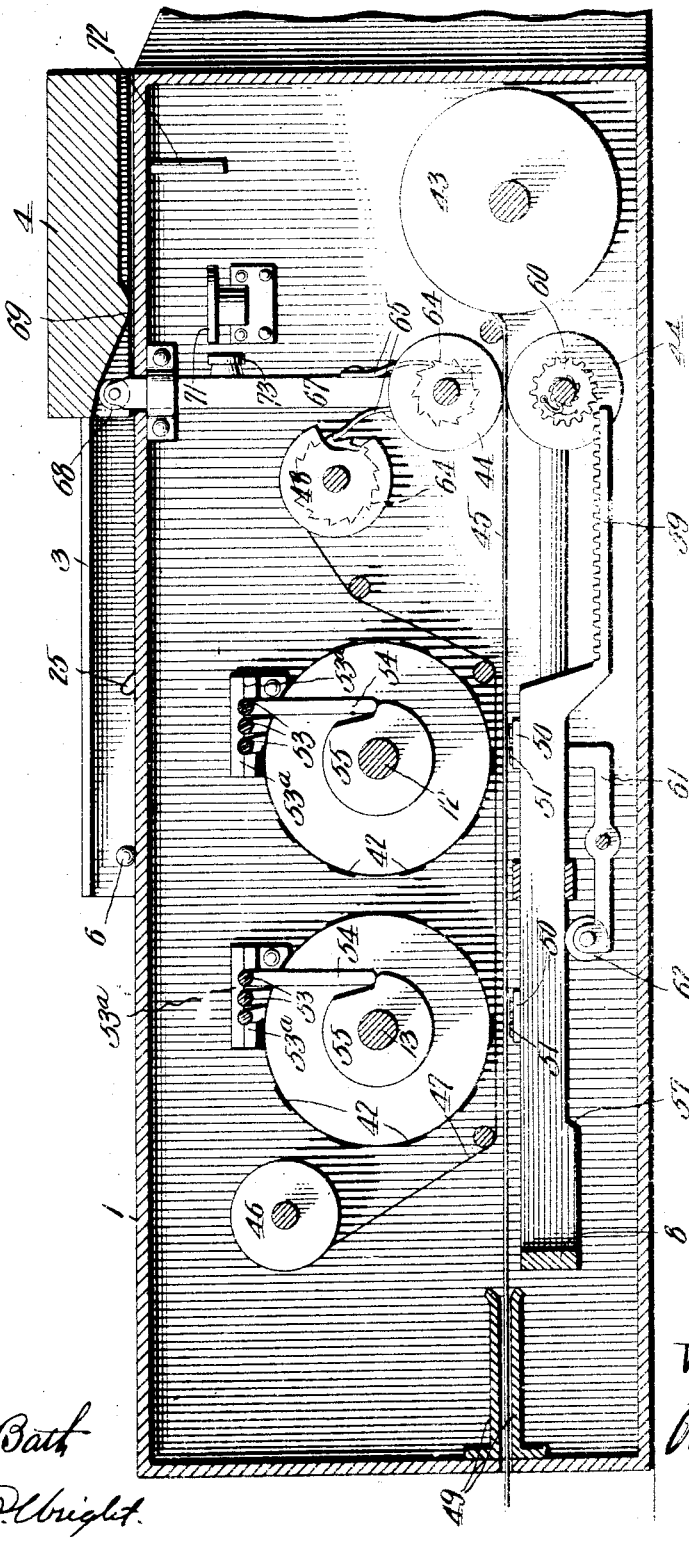

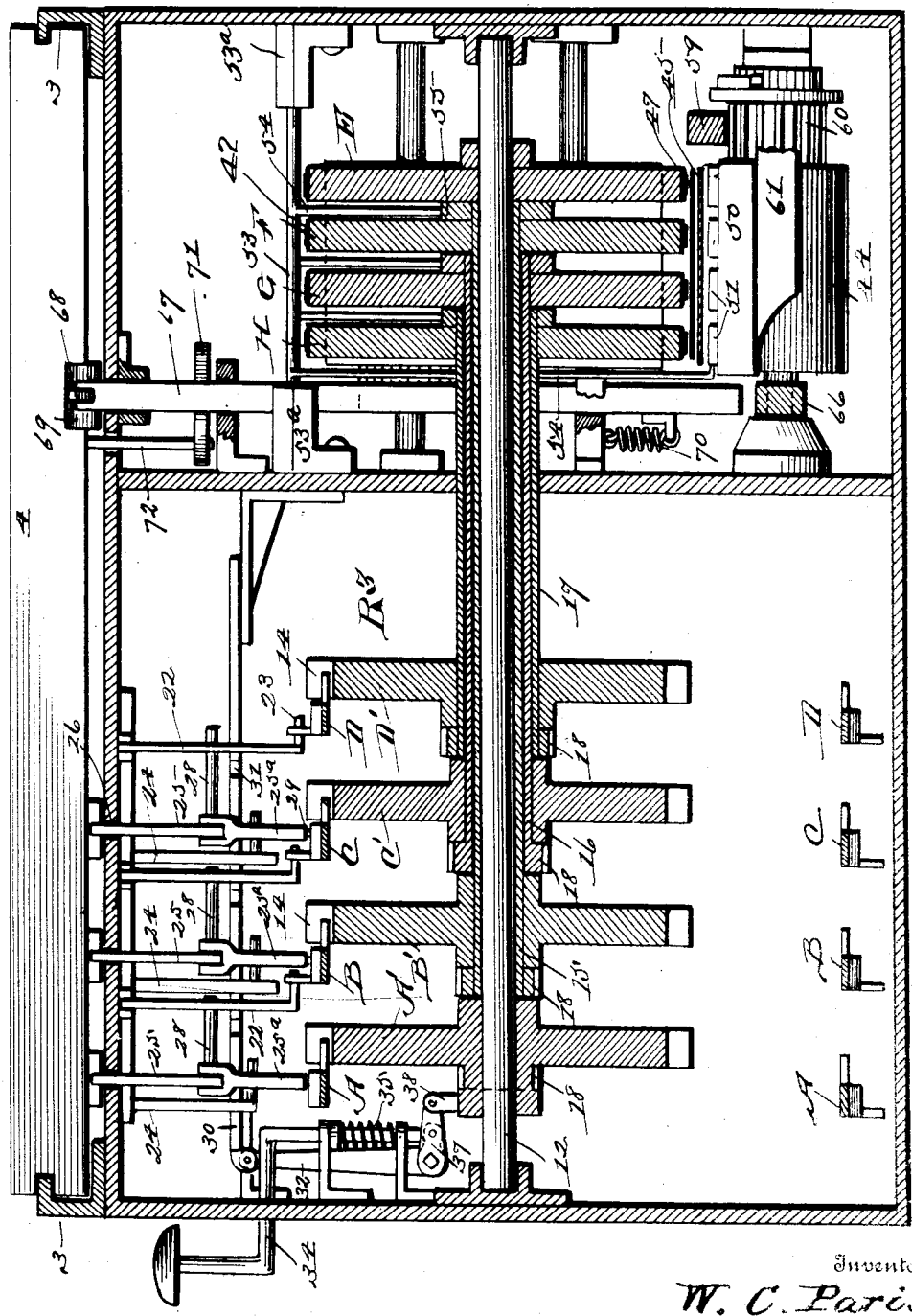

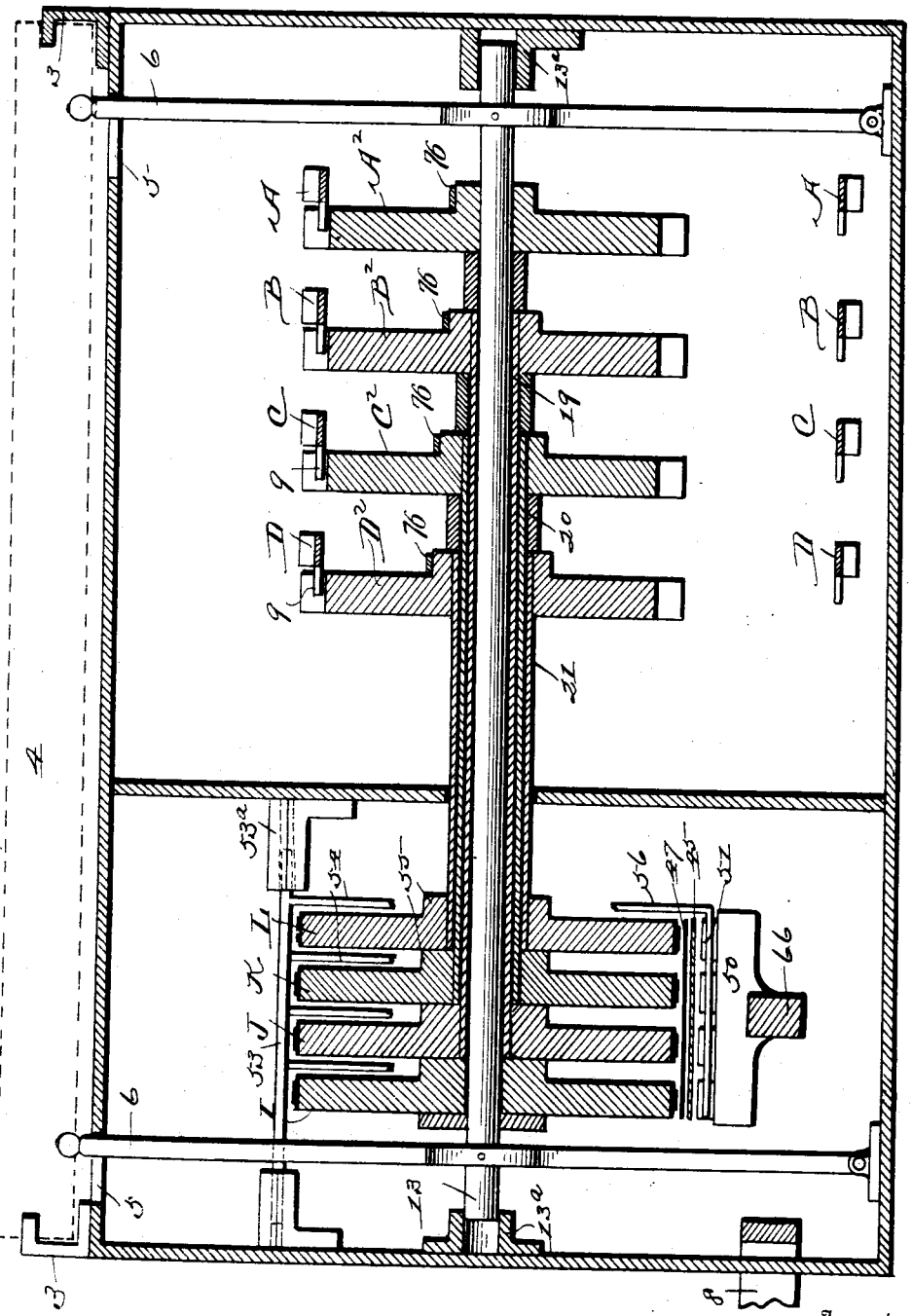

No. 866,298. PATENTED SEPT. 17, 1907.
W. C. PARIS.
ADDING MACHINE.
APPLICATION FILED MAR. 27, 1907.
9 SHEETS—SHEET 7.
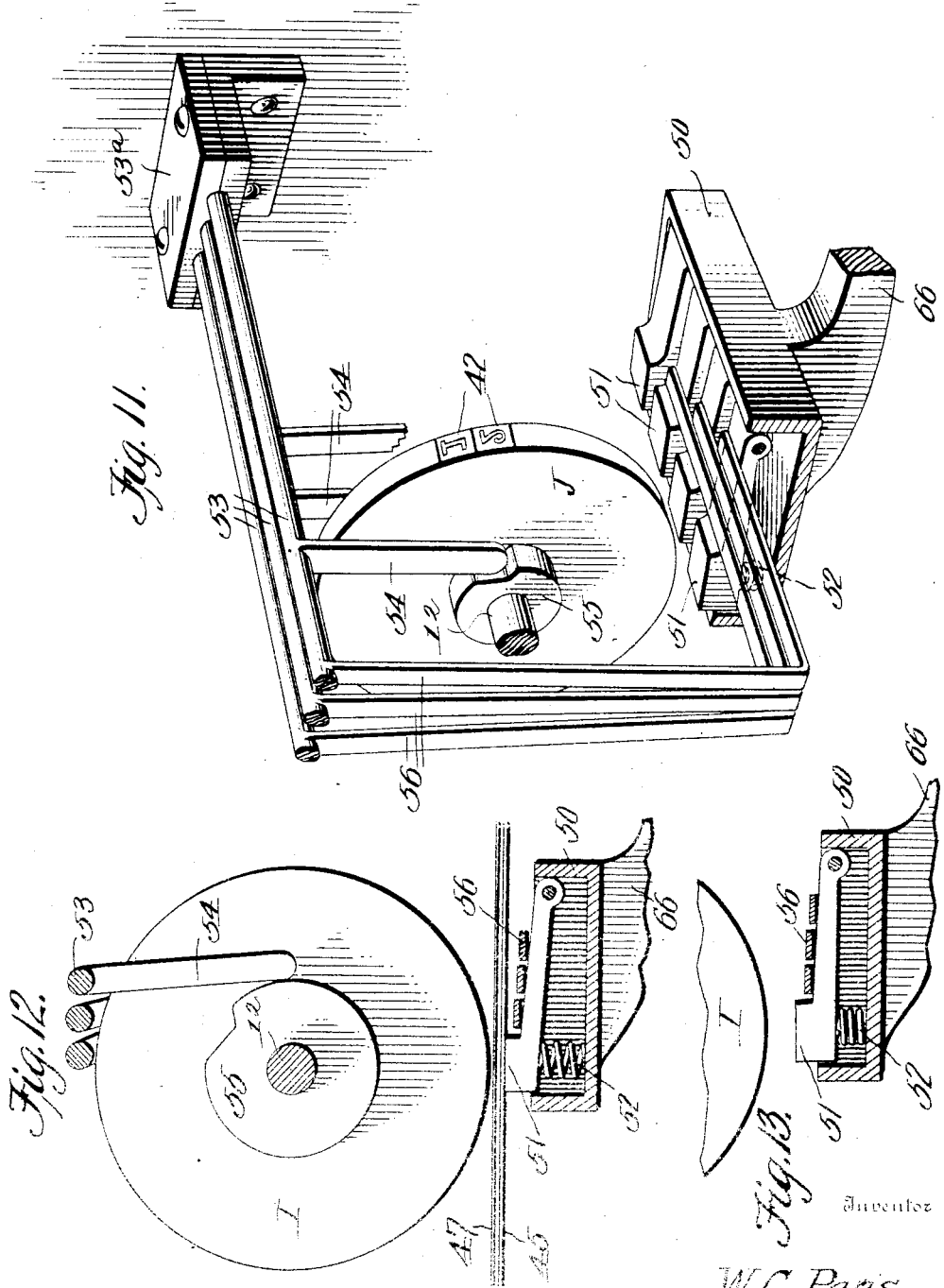
Witnesses
Inventor
W. C. Paris, No. 866,298. PATENTED SEPT. 17, 1907.
W. C. PARIS.
ADDING MACHINE.
APPLICATION FILED MAR. 27, 1907.
9 SHEETS—SHEET 8.
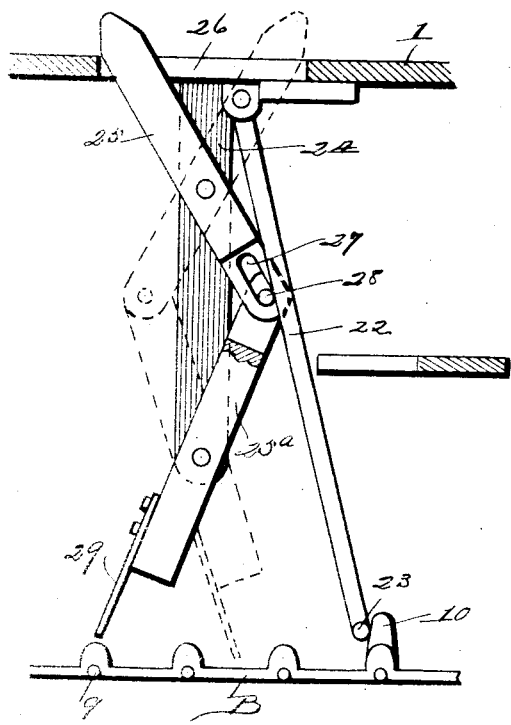
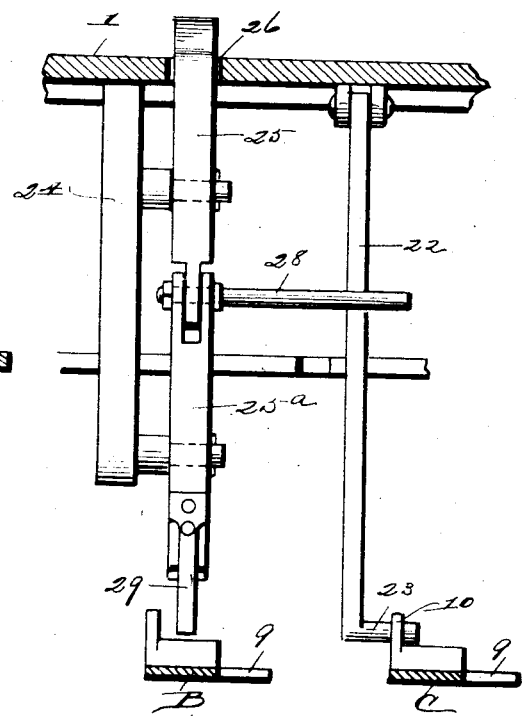
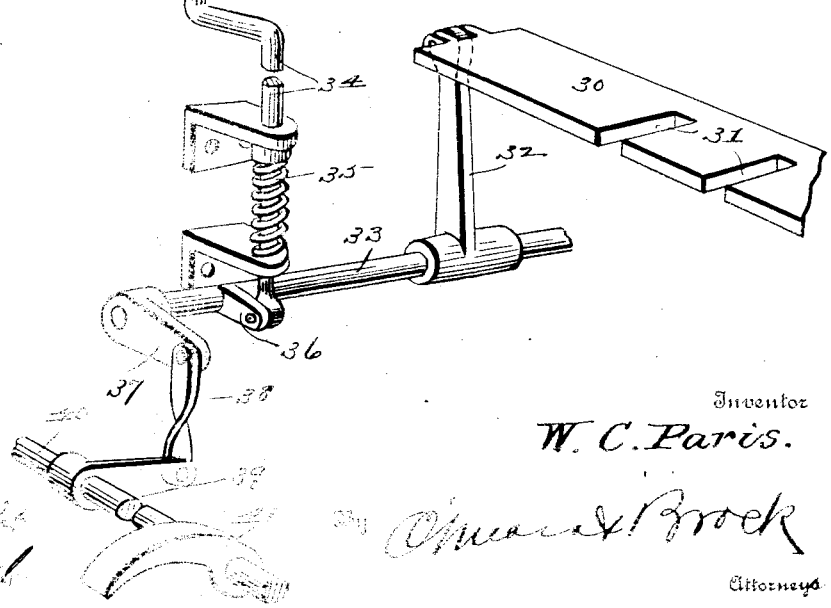
Inventor
W. C. Paris.
Attorneys

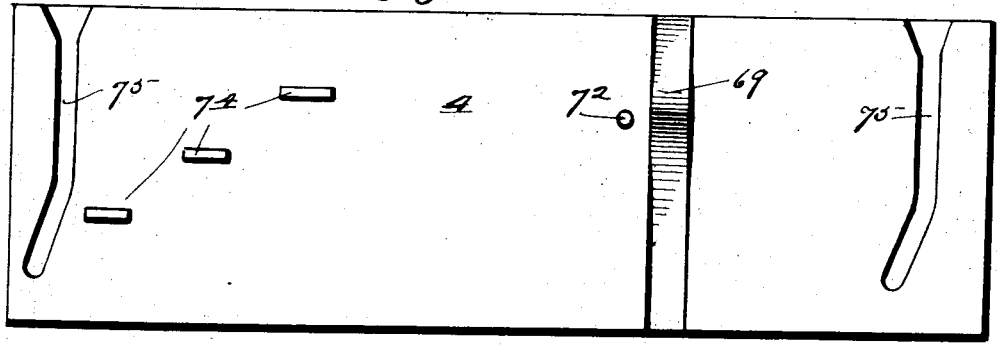
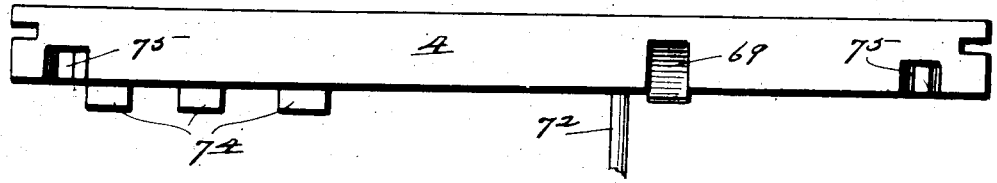
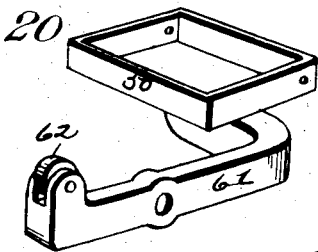
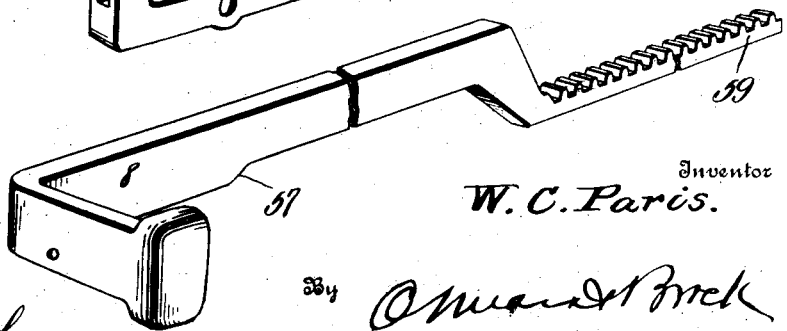

UNITED STATES PATENT OFFICE.

WILLIAM CLARENCE PARIS, OF DYERSBURG, TENNESSEE.

ADDING-MACHINE.

No. 866,298.

Specification of Letters Patent.

Patented Sept. 17, 1907.

Application filed March 27, 1907. Serial No. 364,835.

*To all whom it may concern:*

Be it known that I, WILLIAM CLARENCE PARIS, a citizen of the United States, residing at Dyersburg, in the county of Dyer and State of Tennessee, have invented a new and useful Adding-Machine, of which the following is a specification.

This invention relates to an adding machine, and the object of the invention is a machine of this type which will print upon a strip of paper various amounts, placing the said amounts in columns, and will then automatically print at the bottom of the column the correct sum of the amounts set forth in the column.

A further object of the invention is a machine of this type in which the printing wheels may be reversed in the event of any error being made by the operator in manipulating the machine.

A further object of the invention is to provide in a machine of this kind a set of detail printing wheels representing units, tens, hundreds, etc., which will print successively any number of amounts, placing each item in its proper place in a column of figures, and to provide a set of total printing wheels which will rotate simultaneously with the rotation of the detail printing wheels, and which will automatically add the amounts printed by the detail wheels as they are set down, and which will finally print the total at the bottom of the column.

The invention consists in the novel features of construction hereinafter described, pointed out in the claims and shown in the accompanying drawings, in which, Figure 1 is a perspective view of the machine; Fig. 2 is a longitudinal section taken through the casing and its extension and showing in side elevation a traveling belt, two sprocket wheels driven by said belt and certain operating mechanism; Fig. 3 is a perspective view of a movable slide carried by the casing; Fig. 4 is a perspective view of a portion of one of the traveling belts; Fig. 5 is a plan view of the mechanism carried by the casing, the top of the casing being removed and its side walls being shown in section; Fig. 6 is a detail side elevation of certain stop mechanism; Fig. 7 is a plan view of the parts shown in elevation in Fig. 6, a pin operating stop mechanism being shown in cross section, various positions of the pin and stop mechanism being shown in dotted lines; Fig. 8 is a longitudinal section through the casing showing in elevation the printing mechanism, and also showing the stop mechanism shown in detail in Figs. 6 and 7; Fig. 9 is a transverse section taken upon the line of shaft supporting the total printing wheels; Fig. 10 is a horizontal section taken transversely through the casing on the line of the shaft supporting the detail printing wheels, the shaft being shown in elevation; Fig. 11 is a detail perspective view showing a portion of the printing mechanism, some of the wheels being omitted and other parts being broken away; Fig. 12 is a side elevation of one of the printing wheels, and of the coöperating printing mechanism; Fig. 13 is a section through a movable box showing one of the plungers, and showing the lower portion of the printing wheel immediately upon the opposite side of the wheels shown in Fig. 12; Fig. 14 is a detail side elevation, parts being in section of certain mechanism for operating the total printing wheels; Fig. 15 is a view of the parts shown in Fig. 14 and at right angles to Fig. 14; Fig. 16 is a detail perspective view of means for permitting the reversal of the printing wheels; Fig. 17 is an inverted plan view of the slide shown in Fig. 3; Fig. 18 is an edge view of said slide; Fig. 19 is a perspective view of a box and lever to coöperate with the detail printing wheels; Fig. 20 is a perspective view of a box and lever to coöperate with the total printing wheels; Fig. 21 is a perspective view of a plunger rod designed for moving a strip of paper and actuating the lifting box shown in Fig. 20.

In constructing my device I employ a casing 1 which is provided upon one side and at the rear with an extension 2. This extension 2 is rearwardly extending as it is faced by the operator using the machine. The casing is provided upon its opposite sides and at the top with parallel guide strips 3 between which moves a slide 4. This slide consists of a suitable block of wood or other material which is properly grooved at the ends to fit the guides 3 and it will be more fully described when the operation of the machine is explained. The casing is also slotted upon opposite sides as shown at 5, the slides being transverse with the casing and levers 6 project upwardly through these slots in position to be engaged by the slide 4 as will hereinafter appear. The casing 1 is also slotted upon one side as shown at 7 in which slot works and through which slot projects a suitable hand-operated plunger 8. The extension 2 has its top in a lower plane than the top of the body portion of the casing and the casing 1 is suitably cut away to permit traveling belts A, B, C and D to run across the top of the extension 2 where they are visible and within easy reach of the operator. These belts are provided at fixed intervals with laterally extending pins 9 and opposite each tenth pin the belts carry upwardly extending fingers 10. The belts A, B, C and D travel over suitable rollers 11 mounted respectively in the front end of the casing 1 and the rear end of the extension 2. The belts represent, respectively, units, tens, hundreds and thousands, reading from right to left, the belt D representing the units and the belt A the thousands.

Within the casing are mounted two parallel shafts 12 and 13 and upon the shafts either directly or indirectly are mounted two sets of sprocket wheels and two sets of printing wheels. The first set of sprocket wheels engaged by the belts are indicated at A', B', C' and D', and are notched on their peripheries as shown at 14, which notches are engaged by the pins 9 of the belts, the notches of the sprocket wheel A′ being engaged by the pins of the belt A and the notches of the sprocket wheel B′ being engaged by the pins 9 of the belt B and so on. Upon the shaft 13 are mounted a similar set of sprocket wheels indicated at A², B², C², D². The shaft 12 has no longitudinal movement but the shaft 13 is held in sockets 13ᵃ which permit a certain longitudinal sliding movement of the shaft so that the sprocket wheels mounted upon said shaft may be thrown out of gear by shifting them clear of the pins carried by the belts. The shaft 12 also supports certain printing wheels E, F, G and H, and the shaft 13 supports a set of printing wheels I, J, K and L. The relationship between the two sets of sprocket wheels and the two sets of printing wheels is most clearly brought out in Figs. 9 and 10. Referring, therefore, to these figures it will be noted that the sprocket wheel A′ is mounted directly upon the shaft 12 as is the printing wheel E, both wheels being fixed to the shaft. The sprocket wheel B′ is not mounted directly upon the shaft 12 but is mounted upon a sleeve 15 which fits loosely upon the shaft 12 and the printing wheel F is also mounted upon this sleeve. The sprocket wheel C′ and printing wheel G are in a like manner mounted upon a sleeve 16, and the sprocket wheels D′ and H are mounted upon a sleeve 17. The printing wheels which also represent units, tens, hundreds and thousands are therefore read from left to right, as seen in Fig. 9, and the amounts printed by said wheel would be read in the usual manner, the units appearing upon the right hand side, as the paper or strip printed upon is traveling toward the operator.

In Fig. 10, the view is taken looking in the direction opposite to that of Fig. 9, and it will be noted that the sprocket wheel A² and the printing wheel I are fixed upon the shaft 13, and, therefore, slide with said shaft when it is shifted longitudinally. The various sprocket wheels and printing wheels representing the tens and thousands are mounted upon concentrically arranged sleeves 19, 20 and 21, thus connecting each of the printing wheels J, K and L with its respective sprocket wheel in the same manner as the printing wheels E, F, G and H were connected. It will also be noted that the levers 6 heretofore referred to as projecting through slots 5 in the casing 1 are pivoted at their lower ends to the bottom of the casing and intermediate their ends are secured to the shaft 13 so that when the levers are rocked the shaft is moved lengthwise. It will be obvious that if the set of total printing wheels were only rotated with the detail printing wheels there would be no adding operation performed. In order therefore, that the additional movement necessary may be given to the total printing wheels the following described mechanism is employed which operates in connection with the fingers 10 already mentioned as being placed upon the belts A, B, C and D, there being nine of the pins 9 between the fingers 10.

Pivotally suspended from the top of the casing 1 are a plurality of bars 22 which carry pins 23 at their lower ends and these bars are equal in number to the belts and the pins 23 project into the path traveled by the fingers 10. A suitable depending bracket 24 is arranged adjacent each of the bars 22 and upon these brackets are pivoted intermediate their ends interlocking levers 25 and 25ᵃ. The lever 25 is slotted as shown at 27 adjacent its lower end and the lever 25ᵃ is provided with a pin 28 which works in said slot. The casing 1 is slotted as shown at 26 and the upper portion of the lever 25 works in and projects through the slot 26. A spring plate 29 is carried by the lower end of each lever 25ᵃ and these springs permit of movement of the levers in one direction without moving the belts, but when the levers are shifted in the opposite direction the springs 29 will engage ribs formed upon the belts, which ribs are practically continuous across the belt of the pins 9, and the belt or belts so engaged will be shifted one point or step, thus giving a one-tenth rotation to the wheels. It will be obvious therefore that this additional rotation will be conveyed from the sprocket wheels A′, B′, C′ and D′ or which ever one may be given the additional one-tenth rotation to the corresponding total printing wheels. It will also be obvious that without any other connecting means the belt would give the same movement to the detail sprocket wheels but means are provided as will hereafter appear which resets the detail printing wheels and their corresponding sprocket wheels after each printing operation.

In order to permit correction of any error in manipulating the belts and to allow a reverse movement of all of the wheels in order to correct said error, as well as to prevent any accidental reversal of said wheels the following mechanism is provided. A board 30 is slidably arranged within the main portion of the casing 1 and immediate to the rear of and transverse to the rods 22. This board 30 is provided with a plurality of notches 31 which are normally out of alinement with the rods 22 and prevent a rear movement of said rods. This would, therefore, prevent the passage of any of the fingers 10 in a reverse direction as they would be stopped by the pins 23. One end of the board 30 is pivotally connected to an arm 32 mounted upon a rock shaft 33 and a pin 34 which has an angled portion projecting outwardly on one side of the casing 1, is journaled in suitable angled brackets 34ᵃ and is normally held in an elevated position by a coil spring 35 which is carried by the pin between the two brackets. The lower inner end of the pin is pivoted to a lug 36 carried by the rock shaft 33 and it will be obvious that depression of the pin by the fingers of the hand will rock the shaft 33 and this rocking movement will be communicated to the arm 33 and to the board 30 and will bring the slots 31 into alinement with the rods 22, thus permitting the fingers 10 on reverse movement of the belts or any of them to lift the pins 23 to pass under them. The rock shaft 33 also carries an arm 37 to which is pivotally connected a link 38 which is also pivoted to the free end of arm 39 which is fixed upon a shaft 40 and this shaft carries a plurality of pawls 41 which engage pinions 18 formed on the hubs of the sprocket wheels A′, B′, C′ and D′. These pawls 41 prevent reverse rotation of the said sprocket wheels and the depression of the pin 34 and rocking of the shaft 33 not only shifts the board 30 as described, but also rocks the shaft 40 and disengages the pawls 41 so as to permit travel of the belt in reverse direction and the reversal of the last mentioned sprocket wheels and the total printing wheels. The printing wheels of both sets are provided upon their peripheries with suitable dies 42, which dies are provided with numerals corresponding to those printed upon the top of the extension 2 in alinement with the pins 9 of the belts. I also provide a paper holding drum 43 and also feed rolls 44 and a strip of paper or other suitable material 45 upon which the amounts are to be printed is carried by the drum 43 and passes immediately below the printing wheels and between the feed rollers 44. A ribbon holding roller 46 carries an inking ribbon 47 which winds upon a roller 48, said inking roller passing between the printing wheels parallel to and immediately above the paper strip 45. It will be understood, of course, that idlers are arranged wherever found necessary to control and aid in the travel of the inking ribbon and the paper strip. Suitable guides 49 are arranged in the casing at the point where the paper strip 45 passes thereover in order that there may be little or no danger of the strip becoming broken or tearing off within the casing. Boxes 50 are arranged below each set of printing wheels and in each box are pivoted levers 51 the free ends of which rest beneath the printing wheels and act as plungers, forcing the paper and inking ribbon against the dies. Beneath the free end of each lever 51 is a coil spring 52 which serves to lift the free end of the lever so that it will be in striking position when the box 50 is elevated. In order, however, that only certain predetermined wheels will print an impression at a given time it is necessary that means be devised to hold down out of striking position those levers which are under wheels from which no impression is to be taken during the printing operation. In order to effect this I provide a plurality of rock shafts 53 for each set of printing wheels and these shafts are slidably held in brackets 53ª. The shafts 53 are journaled at each end and carry downwardly extending arms 54. These arms are engaged respectively by cams 55 carried by the printing wheels.

It will be noted that the number of shafts 53 and arms 54 are less than the number of printing wheels, there being no cams or coöperating parts upon the unit wheels, since any amount printed would necessarily contain a unit figure, while it might not contain figures extending into the higher denominations. To each rock shaft 53 is connected an angled arm 56, the lower angle portion of which rests across one or more of the levers 51. For example, the arm 56 which is connected to the rock shaft 53 whose arm 54 is engaged by the cam 55 carried by the printing wheels J which represents tenths extends across one of the levers 51, thus holding down that lever lying under the wheel, representing units. The arm 56 operated by the cam of the wheel K would extend across only two levers, that of the wheels I and J, while the arm 56 operated by the cam of the wheel L, would rest across the levers under the wheels I, J and K. The reason for this construction will be clear when it is noted that the rocking of the last mentioned arm 56 and the consequent lifting of said arm from its lever would bring it into contact with both of the other arms and will, therefore, lift all three of them. If however, only units and tens are to be printed only the lever 51, under the printing wheel I is to be unlocked and consequently the cam 55 of the wheel J, rocks the arm 56 which lies across one of the levers unlocking it and permitting printing.

The sliding plunger or bar 8, which has been heretofore referred to as projecting through an opening upon the one side of the casing is provided with a cam portion 57 upon its lower edge and its inner end is formed into a rack bar 59 which engages and rotates a ratchet wheel 60 which is fixed to the lower feed roller 44. The box 50 beneath the set of total printing wheel is supported upon one end of a tilting lever 61 and the other end of the lever is provided with a roller 62 which is engaged by the cam 57. A spring 63 is connected at one end to an end of the casing 1 and at the opposite end to the plunger or slide bar 8 and returns the same to its normal position after it has been moved rearwardly by hand. The upper roller 44 and the ribbon holding roller 48 are also provided with ratchet wheels 64 which are engaged by spring pawls 65 and these pawls are carried by a vertically movable bar 67. The box 50 placed below the set of detail printing wheels is supported upon one end of a lever 66, the opposite end of which is below and in position to be engaged by the bar 67. This bar projects upwardly through the top of the casing 1, and carries at its upper end a roller 68. A slide 4 heretofore mentioned is provided with a straight cam groove 69 which contains a depending cam projection which engages the roller 68 as the block 4 is drawn by the operator toward him, thereby depressing the bar 67. The depression of this bar tilts one end of the lever 66 and lifts the end supporting the box 50 beneath the detail printing wheels, thereby bringing into play the levers 51 which have been unlocked through the action of the cams 55 and have been lifted by their springs 52 into striking position. As the bar 67 commences its downward movement one of the pawls 65 carried thereby engages a ratchet 64 fixed upon the upper feed roller 44 and rotates the same a sufficient distance to bring a new surface of the paper into position to be printed upon as the box 50 and lever 51 rises. The bar 67 is returned to its original position by a spring 70, shown in Fig. 9, and the upwardly movement of the bar lifts the other pawl 65 which is in engagement with the ratchet 64 upon the ribbon holding roller or drum 48 thus bringing a new surface of the ribbon into position beneath the printing wheels. To hold down the bars 67 against the tension of the spring 70 for the necessary interval of time I employ an eccentrically mounted disk 71 which is cut out as shown at 71ª. The slide 4 carries a depending pin 72 which works through a suitable slot formed in the top of the casing 1 and as the slide 4 is moved along the slideway 3 it first depresses the rod 67 and the pin 72 then comes into engagement with the notch 71ª and shifts the disk 71 so as to throw it above a roller 73 carried upon one side of the bar 67, thus holding the said bar in a depressed position until the slide 4 is returned to its normal position when the pin 72 again engaging the notch 71ª returns the disk 71 to its normal position as shown in full lines in Fig. 7.

The disk is shown in Fig. 6 in the position assumed when the bar 67 is depressed. The underside of the slide 4 also carries a plurality of projections 74 arranged obliquely with respect to each other which engage the levers 25 throwing the same in succession and thus restoring the levers 25 and 25ª to their normal position from which they were thrown through the action of the fingers 10 upon the rods 22. In order to shift the bars 6, and thus throw the detail sprocket wheels $A^2$, $B^2$, $C^2$ and $D^2$ clear of the pins 9 the slide 4 is provided upon its under face with angled grooves 75 which engage the upper ends of the said bars 6. It will also be obvious that the shifting of these sprocket wheels by shifting the shaft 13 upon which they are mounted renders it necessary that the rock shafts 53 which coöperate with the detail printing wheels, I, J, K and L, should be slidably journaled in their bracket 53ᵃ. As the other printing wheels are not shifted longitudinally it is immaterial how the rock shafts 53 coöperating with said set of wheels are journaled.

The operation of the device is as follows:—Assuming the amounts to be 49 and 174. The operator places one finger on belt D opposite the numeral 4 and another finger on the belt opposite the numeral 9 and draws the belts toward him so that the pins 9 adjacent his fingers are brought into alinement with the numeral 1 on the top of the extension 2. The operator releases the belt but continues the drawing movement, sliding the slide or block 4 toward him. As the belts are pulled the sprocket wheels D′ and D² and the printing wheels E and I, are moved through four-tenths of a revolution, bringing numerals 4 in both printing wheels in position for printing. Sprocket wheels C′ and C² are rotated nine-tenths of a revolution, and numeral 9 is brought into printing position on the wheels F and J. Movement of the slide 4 by means of the cam 69 depresses bar 67, lever 66, lifts printing box under the detail printing wheels I, J, K and L. The cam 55 on printing wheels J lifts the lever 56 through arms 54 engaged by its cam and rock-shaft 53. This permits units and tens to be printed. But only the detail printing wheels I and J are employed and the amount —49— is printed on the strip of paper. As the slide 4 continues its travel it reverses the levers 25 and 25ᵃ throwing them into position shown in full lines in Fig. 15. Lastly the engagement of the grooves 75 with the rods 6 shifts the sprocket wheels A², B², C² and D² clear of the belts, and springs 76 connected to said sprockets restore the wheels A² and B² back to their normal position and also return the printing wheels I and J to normal position. The total printing wheels E, F however, remain set at 49. Returning the slide 4 to normal position returns the sprocket wheels A², etc. into engagement with the belts, and also permits bar 67 and levers 66 to return to normal position. The amount 174 is printed in the same manner, the movement of the bar 67 shifting the strip of paper through movement of the pawl 65 engaging ratchet 64 of upper feed roller 44. The effect on the total printing wheels will be to turn E four more points or steps bringing numeral 3 into position, dies 0, 1, 2, and 3 being moved. Wheel F will be shifted 7 points bringing numeral 1 into position. Wheel G is shifted 1 point, bringing numeral 2 into position. This would, at this stage, print 213 as the total. But a finger 10 on belt D engages a pin 23 and shifts levers 25, 25ᵃ into dotted position shown in Fig. 14, shifting only those levers whose spring 29 engages the adjacent belt C. It will be noted that this is the case as belt D has been pulled thirteen points, nine the first time and four the second, and a finger ten is arranged on the belts for every ten pins 9, or points as they may be termed. As slide 4 is again moved it not only prints 174 on the papers under the detail printing wheels I, J and K but also by striking lever 25 shifts belt B and turns printing wheel F one step making the numeral 2 instead of 1 register with the paper. If now the total 223 is to be printed it is only necessary to slide plunger 8. Rack bar 59 rotates ratchet wheel 60, and lower feed roller 44 moving the proper portion of the paper strip 45 under the total printing wheels E, F and G and the cam 57 depresses roller 62 and lever 61 and lifts box 50 under said wheels and the total is printed. The printed portion is drawn out between the guides 49 and torn off.

There may be any number of belts and of wheels in a set.

Having thus described my invention what I claim as new and desire to secure by Letters Patent of the United States is—

1. An adding machine comprising two sets of sprocket wheels, belts running over both sets, said belts having finger engaging means, printing wheels corresponding to the sprocket wheels and actuated thereby, a slidable block, means actuated by said block for operating printing mechanism coöperating with one set of the printing wheels, means operable by hand to coöperate with the set of printing wheels, and means operable by the sliding block for throwing one set of sprocket wheels out of gear so that they may be reversed.

2. In an adding-machine, detail sprocket wheels, total sprocket wheels, belts running over said wheels, each belt actuating a detail and a total sprocket wheel, detail and total printing wheels rotating synchronously with the sprocket wheels, printing mechanism coöperating with the printing wheels, and means for throwing the detail sprocket wheels out of gear with the belts.

3. In an adding machine two sets of sprocket wheels having notched peripheries, belts, printing wheels rotated step by step with the sprocket wheels, pins carried by each belt engaging the notches of a sprocket wheel of each set, means for sliding the sprocket wheels of one set clear of the pins, and means for returning said wheels to their normal positions when clear of the pins.

4. In an adding machine, belts having projecting pins, sprocket wheels arranged in sets and notched, the pins engaging the notches, one of said sets being detail wheels, means for disengaging the said wheels from the belts, means for returning the wheels to normal position when disengaged, fingers carried by the belts, alining with every tenth pin, means operable by said fingers for rotating one step a wheel of the other set adjacent the wheel operated by the belt pins, and printing wheels operating synchronously with the sprocket wheels.

5. In an adding machine, a set of detail printing wheels, a set of total printing wheels, the wheels of each set being mounted on concentric shafts, a sprocket wheel on each of said shafts, a plurality of belts, said belts equaling in number the number of detail printing wheels, each belt driving a sprocket wheel of a detail printing wheel, and a sprocket wheel of a total printing wheel, means for throwing the sprocket wheels connected to the detail printing wheels clear of the belt after each printing operation, means for reversing said sprocket wheels, and the detail printing wheels when clear of the belt, fingers carried by the belt at predetermined intervals, and means engaged by said fingers for giving a partial rotation to one of the sprocket wheels connected to the total printing wheels, as and for the purpose set forth.

6. In an adding machine, a set of detail printing wheels, means for independently rotating said wheels, a set of total printing wheels, a box under each set of wheels, an inking ribbon traveling between said boxes and wheels, a strip of material to be printed on, means for moving said strip, levers pivoted in the boxes adapted to bear on the underside of the strip, levers supporting said boxes, and separate means for lifting each box.

7. In a device of the kind described, a shaft, a sprocket wheel fitted thereon, a printing wheel fixed on the shaft, a plurality of concentrically arranged sleeves mounted loosely on the shaft, a sprocket wheel on each of said sleeves, a printing wheel on each sleeve, belts coöperating with the sprocket wheels, and printing mechanism coöperating with the printing wheels.

8. In an adding machine, a set of printing wheels, a vertically movable box, levers pivoted in the box and having their free ends resting below the wheels, springs under the levers, rock shafts, angled arms carried by said shafts and resting respectively on the levers, and means for rocking said shafts.

9. In an adding machine, printing wheels, vertically movable levers adapted to coöperate with the wheels, rock shafts, angled arms carried by the shafts, said arms engaging the levers, and varying in length, cams carried by the wheels, and arms carried by the rock shafts engaging said cams.

10. In an adding machine, a plurality of printing wheels, mounted side by side, and rotatable independent of each other, said wheels representing units, tens, hundreds and thousands, cams carried by the three last mentioned wheels, rock shafts, arms carried by said rock shafts engaging the cams, pivoted levers arranged below the cam-carrying wheels, and angled arms of varying lengths carried by the rock-shaft and resting on the levers, the longest arm resting across all of the levers and operable by the cam on the second wheel, the remaining arms resting respectively on two levers and one lever, and being operable by the cams of the third and fourth wheels, respectively, as and for the purpose set forth.

11. In an adding machine, two sets of printing wheels, boxes under said wheels, a ribbon traveling between the wheels and boxes, levers carried by the boxes, levers supporting the boxes, a vertically movable rod, a slide adapted to depress the rod and bring it into engagement with one of the box supporting levers, a strip of paper between the wheels and levers in the boxes, a ratchet for moving said paper the distance between one set of wheels and the other, and a slidable bar having ratchet teeth to engage the ratchet and a cam to engage the other box supporting lever.

WILLIAM CLARENCE PARIS.

Witnesses:
J. F. BIGGS,
R. S. WATKINS.